Nov. 2, 1926.
C. S. KELLUM
1,605,116
LIQUID LEVEL INDICATOR
Filed May 3, 1919
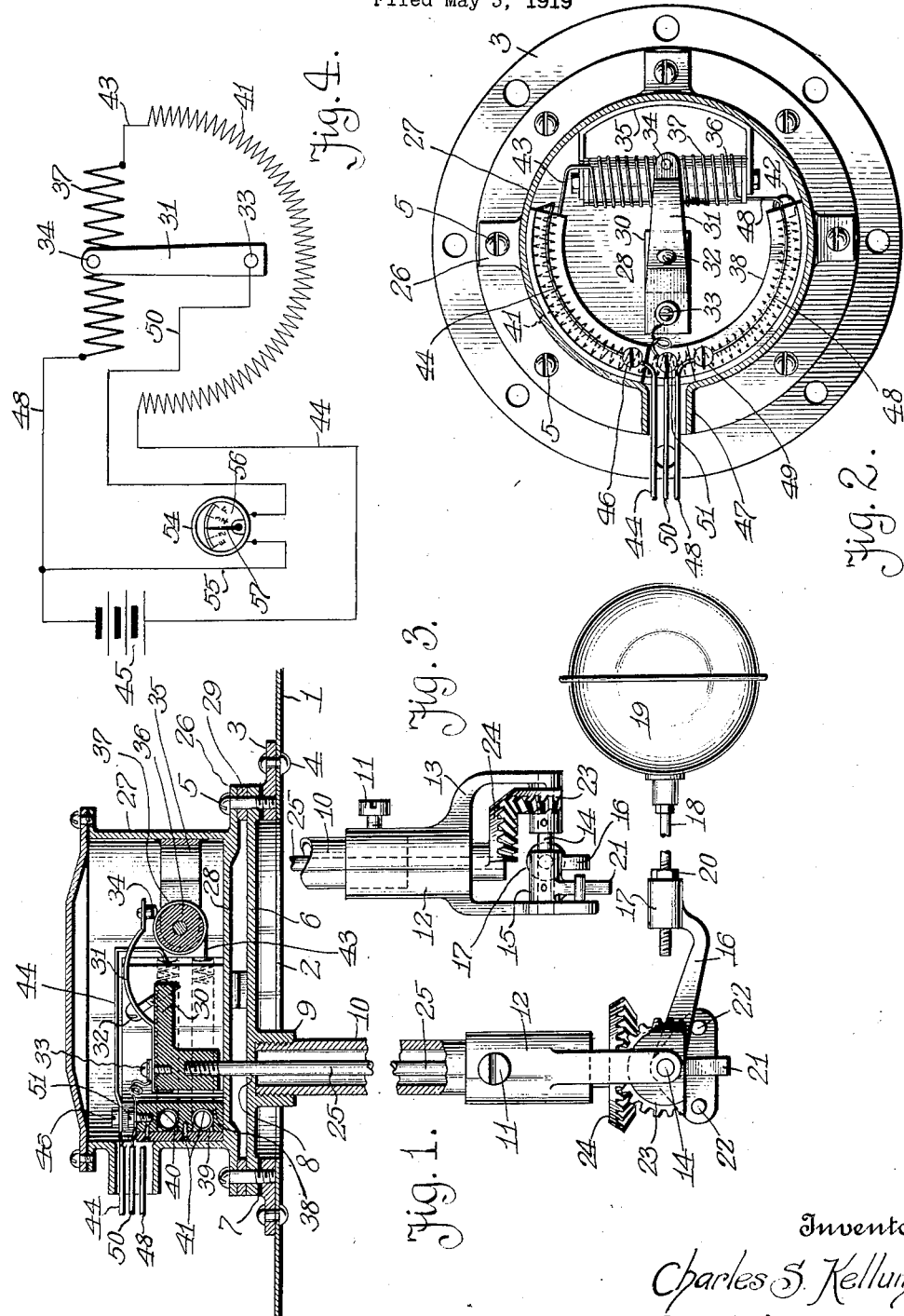
Inventor
Charles S. Kellum,
By
Attorneys Patented Nov. 2, 1926.

1,605,116

UNITED STATES PATENT OFFICE.

CHARLES S. KELLUM, OF DETROIT, MICHIGAN.

LIQUID-LEVEL INDICATOR.

Application filed May 3, 1919. Serial No. 294,534.

In my pending application, Serial No. 238,459, filed June 6, 1918, there is disclosed an electric gauge that may be advantageously used in connection with a gasoline or fuel tank forming part of the fuel supply system of an automobile, and a rheostatic method of wiring is shown which includes a variable resistance and a variable current circuit. The system actuates the instrument through a variable resistance in the main circuit, and in contradistinction to such a system associated with a gauge, the present invention involves a constant current, fixed resistance system which actuates the instrument through a variable shunt and therefore requires a less amount of current than a rheostat in the same space.

Briefly described, my present invention includes two distinct circuits, a fixed resistance, constant current main circuit formed by connecting a high resistance coil and a shunt coil in series to the opposed poles of a storage battery, and a variable shunt circuit formed by connecting one terminal of the storage battery through the measuring instrument or millivoltmeter to the shunt coil by a sliding contact arm. In this manner a constant current is always flowing through the main circuit. The measuring instrument or millivoltmeter is actuated by moving a contact arm along the shunt coil which varies the length of the shunt resistance and consequently the voltage drop in the shunt circuit. The principle involved is therefore somewhat similar to a potentiometer, the movable arm forming contact with the shunt resistance which registers the resistance of the shunt coil on the galvanometer or measuring instrument. The total current drop in the shunt resistance desired is about seventy millivolts and the high resistance is so proportioned as to produce the desired drop. It is therefore obvious that the current consumption in this system is very small, making it practical for use in connection with a storage battery. Using a high resistance element of one hundred ohms, the maximum power required to actuate the recording instrument or millivoltmeter with .07 amperes of current flowing from a 7 volt battery is about .49 watts.

A gauge which uses the above system, due to the small amount of difference in potential, precludes any possibility of a spark and consequently lessens any danger of igniting gasoline or explosive vapor in proximity to the gauge. The mechanical construction entering into the gauge contributes certain advantages, for instance, an air space or gap of sufficient area between the instrument and the tank to prevent the formation of any explosive vapor within the casing which incloses the electrical elements; a float member which compensates for stresses and strains incurred by stopping the contact arm of the gauge; means in connection with the float member which prevents it from being damaged by impinging against the top or bottom of the tank in which it is placed, and an inclosure for the main operating shaft of the gauge which prevents gasoline or other fuel from being splashed from the tank at the gauge connection.

Other advantages of my improvement will be apparent as the nature of the invention is better understood, and reference will now be had to the drawing illustrating a gauge which has been constructed, tested and found practical, but nevertheless, I do not care to confine my invention to the precise construction and arrangement of parts shown, other than defined by the appended claims.

In the drawings,

Figure 1 is a vertical sectional view of the main portion of the gauge as mounted on the wall of a tank or other receptacle, with that portion of the gauge below the wall partly in elevation and partly broken away;

Fig. 2 is a horizontal sectional view of the gauge;

Fig. 3 is a view in elevation of the inner end of a float member, showing its manner of actuating a shaft of the gauge, and Fig. 4 is a diagrammatic view illustrating the electrical connections of the gauge.

In the drawing, the reference numeral 1 denotes a wall of a gasoline tank or other receptacle, provided with an opening 2 and surrounding said opening at the outer side of the wall 1 is a collar 3 that may be riveted or otherwise connected to the tank wall 1, as at 4.

Mounted on the collar 3, by screws 5 or other fastening means, is a base plate 6 with a washer or gasket 7 interposed between the marginal edges of said base plate and the collar 3. The plate 6 has an eccentrically disposed opening 8 and a depending interiorly screw threaded connection 9 for the upper end of a tube or shaft inclosure 10 that extends into the tank and is rigidly held relative to the wall 1.

Mounted on the inner or lower end of the tube 10, by a set screw 11 or other fastening means, is the sleeve portion 12 of a stirrup or yoke bearing 13 supporting a rock shaft 14. Fixed on the rock shaft 14 is a hub or sleeve 15 provided with an arm 16 terminating in an interiorly screw threaded holder 17 for the threaded end of a float rod 18 which has the opposite end thereof provided with a conventional form of float 19, preferably in the form of a hollow spherical body. The float rod 18 is adjustably held relative to the holder 17 by a jamb or lock nut 20 and the elements 16 to 20 inclusive constitute a float member possessing sufficient buoyancy to be raised and lowered to the level of gasoline or other fuel in a tank so that the shaft 14 will be rocked or oscillated as the float 19 is raised and lowered.

The hub or sleeve 15 of the float member has a crank 21 extending between stop pins 22 carried by one of the arms of the stirrup or yoke 13, said stop pins limiting the rocking movement of the shaft 14 and consequently preventing the float from contacting with the top and bottom walls of the tank, thus preventing the tank walls or the float from being injured by an excessive or sudden float action, also, limiting movement of the contact piece 34 on the coil 37.

Fixed on the rock shaft 14 is a sector gear 23 meshing with a similar gear 24 on the lower end of a gauge shaft 25 that extends upwardly through the tube 10 and through the opening 8 of the base plate 6, so that the upper end of the shaft may operate an electrical device that will now be considered.

The screws 5 or the fastening means of the base plate 6 hold lateral apertured ears 26 of a cylindrical casing 27 having a bottom plate 28 supported in spaced relation to the base plate 6 by washers or spacing members 29 on the screws 5, between the ears 26 and the base plate 6. The elevated bottom of the casing 27 provides an air gap between the casing and the base plate, and this air gap precludes the accumulation of an explosive vapor, in proximity to the casing 27, that might be dangerous. However, the connection 9 and the tube 10 preclude the splashing of gasoline out of the opening 8 of the base plate 6, thus affording an additional safety factor for the gauge.

The gauge shaft 25 extends through an opening in the bottom wall 28 of the casing 27 and is provided with a head of insulation material 30 supporting a resilient adjustable contact arm 31 which has the outer end thereof bowed so that its tension may be regulated by an angularly disposed set screw 32 carried by the head 30. The inner end of the arm 31 is held by a binding post 33 and the outer end of said arm is provided with a contact piece 34.

Suitably mounted in the casing 27, preferably against a wall thereof, is a bracket 35 provided with a holder or spool 36, of insulation material, for a shunt resistance coil 37 having its convolutions closely assembled on the spool or holder 36, as best shown in Fig. 2. The shunt resistance coil is below the outer end of the resilient arm 31 and the resiliency of said arm maintains the contact piece 34 in engagement with the shunt resistance coil so that when the contact arm is swung in a lateral plane by the gauge shaft 25, the contact piece 34 may engage convolutions of the shunt resistance coil and thus vary the length of the shunt resistance and the voltage drop in a shunt circuit.

In the casing 27 against that wall thereof opposite the bracket 35 is a semi-cylindrical housing 38 made of insulation material, said housing having a set of grooves 39 normally closed by a plate 40 and in the grooves 39 are high resistance coils 41 said coils having the ends thereof connected, as at 42, and said coils have been represented as continuous in Fig. 4 of the drawing. One end of the continuous coil is connected by a wire 43 to the shunt resistance coil 37, and the opposite end of the coil 41 has an outlet wire 44 to a storage battery 45. The outlet wire 44 extends along the top of the housing 38 to a binding screw 46 and then out of an outlet connection or nipple 47 of the casing 27.

The shunt resistance coil 37 has an outlet wire 48 extending along the top of the housing 35 and held by a binding screw 49 so that said wire may also extend through the outlet connection 47.

The binding post 33 of the arm 31 is connected to a wire 50 held relative to the housing 35 by a binding screw 51 and the wire 50 extends out of the connection 47 to a measuring instrument 54. The measuring instrument 54 is also connected by a wire 55 to the wire 48, which is connected to the storage battery 45.

The measuring instrument 54 is constructed upon the principle of a galvanometer and said instrument has a dial 56 provided with suitable indicia to indicate that the tank is full, empty or exactly what quantity of fuel may be in the tank as will be indicated by the electrically operated needle 57 in front of the dial. The measuring instrument is adapted to be located on the dash of an automobile or at some place where it may be readily observed by the driver or chauffeur of an automobile.

In operation the float actuated contact arm 31 operates in a variable shunt circuit and by contacting with the shunt resistance coil 37 it registers the resistance of the shunt coil in the measuring instrument. In order to obtain the desired drop of current for the shunt resistance coil 37, the high resistance coil 41 is interposed and this is a desideratum in connection with the storage battery of an automobile, so that the current consumption will be exceedingly low, as pointed out in the beginning. It is thought that the advantages of operating the gauge on a constant current fixed resistance circuit through a variable shunt will be apparent without further description, and I would have it understood that any suitable electrically operated measuring instrument may be used in the system.

Furthermore, that the contents of the casing 27, particularly the coil 41, may be rearranged without detriment to the general result of my invention.

What I claim is:—

The combination with a tank and a vertical tube extending thereinto, of operating means for a liquid level indicator supported by the tank, said means being within the tank and comprising a vertically disposed yoke having a sleeve portion on the lower end of said vertical tube, a rock shaft journaled in said yoke at a right angle to the axis of said tube, a shaft within and extending lengthwise of the tube, a sector gear on said rock shaft near one end, a sector gear on the tube shaft and disposed at a right angle to the sector gear on said rock shaft and meshing with said sector gear, a sleeve fixed on the opposite end of said rock shaft and having long and short arms with the long arm extending normally in the lateral direction with reference to the tube, a float supported from the long arm of said sleeve, and a pair of stop pins supported by said yoke and between which extends the short arm of said sleeve to contact with said pins and limit the rocking movement of said rock shaft.

In testimony whereof I affix my signature.

CHARLES S. KELLUM.